(12) United States Patent
Zalucki

(10) Patent No.: US 11,070,240 B1
(45) Date of Patent: Jul. 20, 2021

(54) DIGITAL AMPLITUDE CONTROL FOR TRANSMISSION OF RADIO FREQUENCY SIGNALS

(71) Applicant: BAE Systems Information and Electronic Systems Integration Inc., Nashua, NH (US)

(72) Inventor: Michael A. Zalucki, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/069,466

(22) Filed: Oct. 13, 2020

(51) Int. Cl.
*H04B 1/04* (2006.01)

(52) U.S. Cl.
CPC ... *H04B 1/0475* (2013.01); *H04B 2001/0408* (2013.01)

(58) Field of Classification Search
CPC .......................... H04B 2001/04; H04B 1/0475
See application file for complete search history.

(56) References Cited

U.S. PATENT DOCUMENTS

| | | | | |
|---|---|---|---|---|
| 6,418,173 B1* | 7/2002 | Matsuoka | ............... | H03C 3/406 |
| | | | | 375/254 |
| 9,337,783 B2* | 5/2016 | Matsubara | ............ | H03F 1/3247 |
| 2009/0191907 A1* | 7/2009 | McCallister | ........ | H04L 27/2624 |
| | | | | 455/501 |
| 2018/0145859 A1* | 5/2018 | Xu | ...................... | H04L 27/2618 |

* cited by examiner

*Primary Examiner* — Vineeta S Panwalkar
(74) *Attorney, Agent, or Firm* — Finch & Maloney PLLC; Scott J. Asmus

(57) ABSTRACT

Techniques are provided for amplitude control of radio frequency signals for transmission. A methodology implementing the techniques according to an embodiment includes calculating an average power level of a segment of the signal. The method also includes calculating a maximum magnitude of samples of the segment. The method further includes generating a first scale factor based on the average power level, as a calculation of the reciprocal of the square root of the ratio of the average power level to a maximum power limit. The method further includes generating a second scale factor based on the maximum magnitude, as a calculation of the ratio of the maximum magnitude limit to the maximum magnitude. The method further includes scaling the samples of the segment based on the smaller of the first and second scale factors.

20 Claims, 11 Drawing Sheets

DIGITAL AMPLITUDE CONTROL FOR TRANSMISSION OF RADIO FREQUENCY SIGNALS

STATEMENT OF GOVERNMENT INTEREST

This invention was made with United States Government assistance. The United States Government has certain rights in this invention.

FIELD OF DISCLOSURE

The present disclosure relates to signal processing, and more particularly, to digital amplitude control of radio frequency (RF) signals for transmission.

BACKGROUND

Transmitters are generally designed to transmit signals at a pre-determined power level with limited ability for adjustment. Digital to analog converters also have a maximum level that cannot be exceeded. As such, signal levels and power levels for transmission typically need to be predetermined based on a worst-case analysis for the design application, or otherwise known. This can result in situations where either less than full power is transmitted, which can be inefficient, or where the transmitted power is too large, which drives the transmitter into saturation and generates distortion. Neither situation is desirable.

Figure 1:
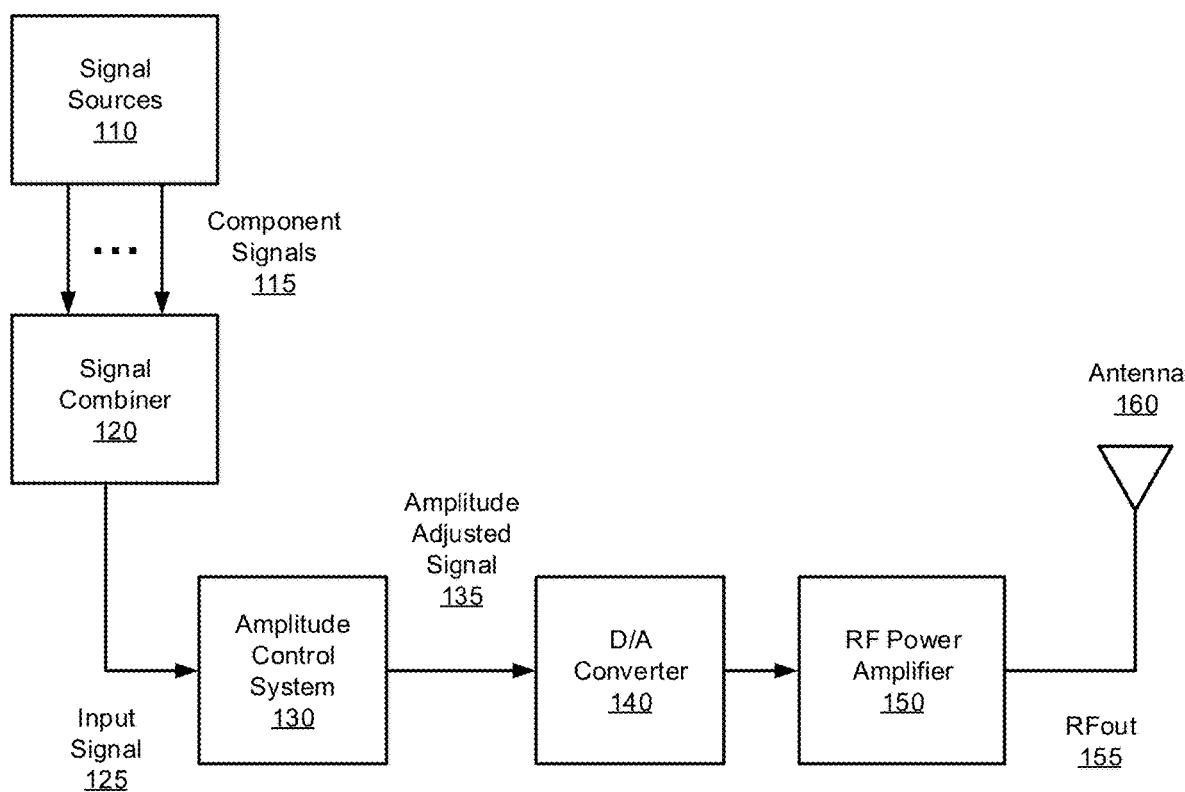
FIG. 1 illustrates a transmitter configured with an amplitude control system, in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for digital amplitude control of RF signals for transmission based on real-time analysis of the signal. As previously noted, transmitters are generally designed to transmit signals at a pre-determined power level, and digital to analog converters (DACs), which convert the digital signal into the analog domain for transmission, also have a maximum conversion value that cannot be exceeded (which results in saturation of the DAC and wasted transmission power). In some applications, however, the characteristics of a signal to be transmitted are not known in advance. This is particularly true when multiple signals from multiple sources are combined for simultaneous transmission in a power share scheme. As such, transmitter systems may be designed for a worst-case scenario, which is inefficient when less than full power is transmitted, or insufficient when the signal is too large and results in transmitter saturation and distortion.

To this end, techniques disclosed herein provide dynamic digital amplitude control based on a specified maximum power level or limit associated with the transmitter and a specified maximum magnitude value or limit associated with the DAC. The amplitude control may include both attenuation and gain. According to an embodiment, the digital signal is analyzed prior to transmission and attenuated or amplified based on specified maximum power or magnitude limits. The attenuation/gain factors are tracked over time and smoothed to reduce spectral smearing that may be caused by the Gibbs phenomenon associated with abrupt changes in the signal. The signal is dynamically scaled in response to changes in the signal level that can occur, for example, when one or more of the combined signals are switched on or off, as in the case of simultaneous transmission of multiple signals. Numerous variations will be apparent in light of this disclosure.

The disclosed techniques can be used in a wide variety of applications including, for example, radar and communication systems such as those for aircraft, spacecraft, watercraft and ships, electronic warfare systems, as well as those for personal communication devices, although other applications will be apparent. In accordance with an embodiment, a methodology to implement these techniques includes calculating an average power level of a segment of the signal to be transmitted. The method also includes calculating a maximum magnitude of samples of the segment. The method further includes generating a first scale factor based on the average power level, as a calculation of the reciprocal of the square root of the ratio of the average power level to a maximum power limit. The method further includes generating a second scale factor based on the maximum magnitude, as a calculation of the ratio of the maximum magnitude limit to the maximum magnitude. The method further includes scaling the samples of the segment based on the smaller of the first and second scale factors. In some embodiments, the method further includes adjusting the first and second scale factors for reduction of edge distortion and for saturation, prior to the selection of the smaller one, while in other embodiments such adjusting can be carried out on the selected scale factor (post-selection), as will be explained in greater detail below.

It will be appreciated that the techniques described herein may provide improved systems and methods for dynamic amplitude control of transmitted signals, compared to systems that rely on pre-determined maximum power and amplitude levels that require prior knowledge of the signal characteristics and which are designed to inefficient worst-case scenarios. Numerous embodiments and applications will be apparent in light of this disclosure.

System Architecture

FIG. 1 illustrates deployment of an amplitude control system 130 in a transmitter system 100, in accordance with an embodiment of the present disclosure. The transmitter system 100 is shown to include signal sources 110, signal combiner 120, amplitude control system 130, DAC 140, RF power amplifier 150, and antenna 160.

The signal sources 110 are configured to supply one or more signals (e.g., component signals 115) to be transmitted by the transmitter system 100. Each of the component signals 115 may be generated by a user or application that is, for example, hosted on the platform that employs the transmitter system 100, or provided from some other suitable source. For example, multiple users may be sharing the transmitter to broadcast their respective communication signals. Additionally, for example, a radar system may also be sharing the transmitter to broadcast a radar signal. Other potential users and applications can be envisioned. The signal combiner 120 is configured to combine the various component signals provided by signal sources 110 into a composite digital input signal 125 to be provided to the amplitude control system 130. In some embodiments, the combining may be performed as a summation of each of the component signals 115 on a sample by sample basis. Thus, each user/application participates in a power-sharing scheme with the transmitter in which the available transmit power is divided up between the various signals.

The amplitude control system 130 is configured to generate an amplitude adjusted signal 135 based on the input signal 125, which in some instances may be a composite of many component signals. The operation of the amplitude control system 130, is described in greater detail below, but at a high-level, the amplitude control system 130 is configured to dynamically control the amplitude of the input signal based on analysis of that signal with respect to power and magnitude. This avoids the need to pre-allocate transmitter power to each of the component signals that may be sharing the transmitter.

The DAC 140 is configured to convert the amplitude adjusted signal 135 from a digital signal to an analog signal. The RF power amplifier 150 is configured to generate an RF signal, RFout 155, based on the provided analog signal, for transmission through antenna 160.

Figure 2:
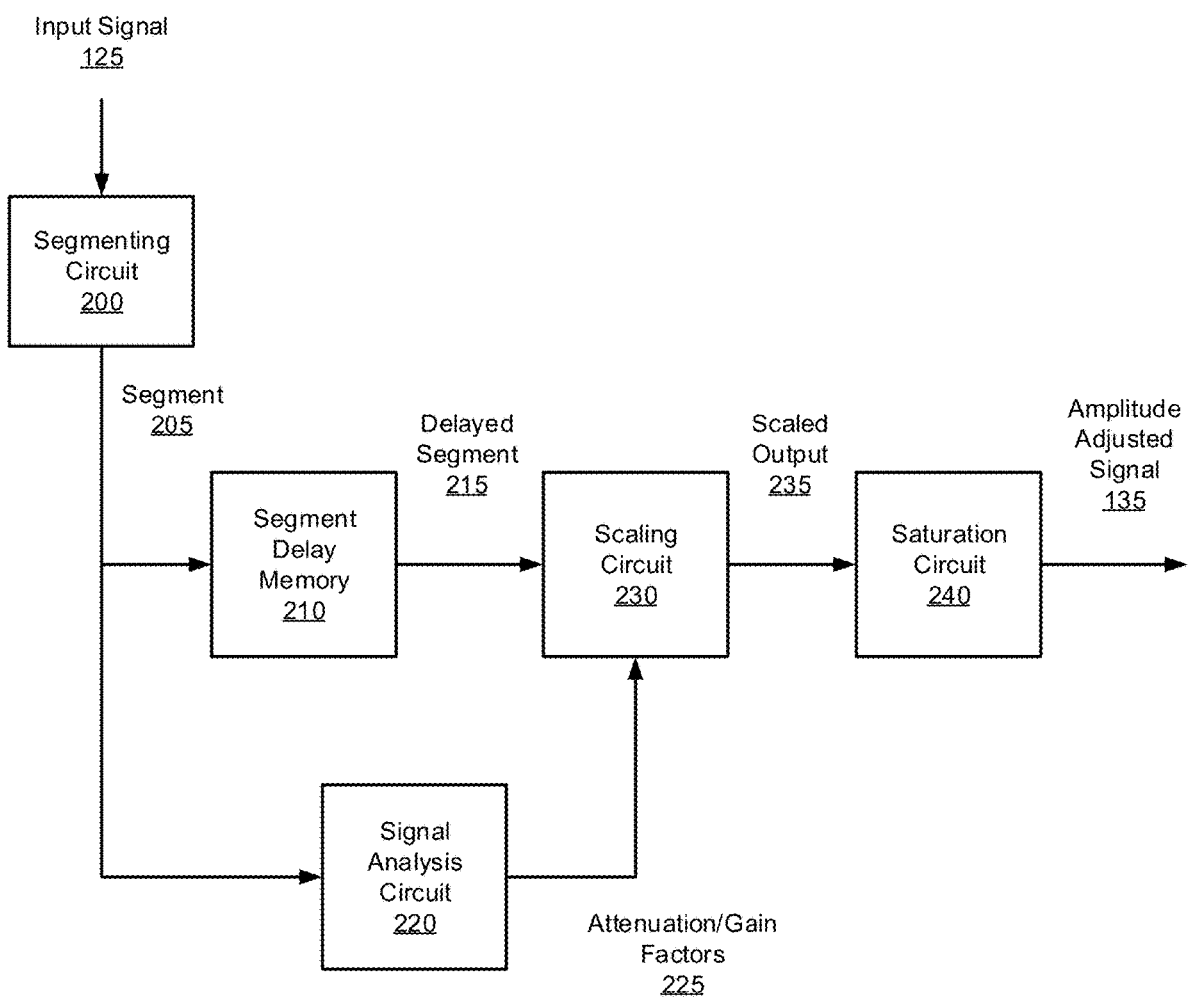
FIG. 2 is a block diagram of the amplitude control system of FIG. 1, configured in accordance with an embodiment of the present disclosure.

FIG. 2 is a block diagram of the amplitude control system 130, configured in accordance with an embodiment of the present disclosure. The amplitude control system 130 is shown to include a segmenting circuit 200, a segment delay memory 210, a signal analysis circuit 220, a scaling circuit 230, and a saturation circuit 240.

The segmenting circuit 200 is configured to break up the input signal 125 into segments 205 for analysis and processing by the amplitude control system 130. The segments may be of any desired length and are processed in the temporal order in which they are received. In some embodiments, the input signal 125, comprises signed real-valued RF data samples, as would be provided, for example, to the DAC 140.

The segment delay memory 210 is configured to store each segment 205 for the duration of time that the signal analysis circuit 220 requires to analyze the segment 205 and generate the attenuation/gain factors 225, which will be applied to the delayed segment 215 by scaling circuit 230.

This ensures that the attenuation or gain is applied to the data on which the analysis was performed. Thus, the amplitude control system 130 operates in real-time with a pipeline delay associated with the segment delay memory.

The operation of the signal analysis circuit 220 will be described in greater detail below, but at a high level, the signal analysis circuit 220 is configured to analyze each segment 205, to determine the power and magnitude of the input signal 125 in that segment, and to generate attenuation/gain factors 225 based on that analysis for use by the scaling circuit 230.

The operation of the scaling circuit 230 will also be described in greater detail below, but at a high level, the scaling circuit 230 is configured to apply the attenuation/gain factors 225 to the delayed segment 215 to generate a scaled output 235 which controls the amplitude of the input signal 125, so that it is matched to the DAC 140 and the RF power amplifier 150.

The saturation circuit 240 is configured to limit, to the maximum permitted value, any values of the scaled output 235 that might otherwise still exceed that maximum permitted value after scaling. The result of this operation is the amplitude adjusted signal 135.

Figure 3:
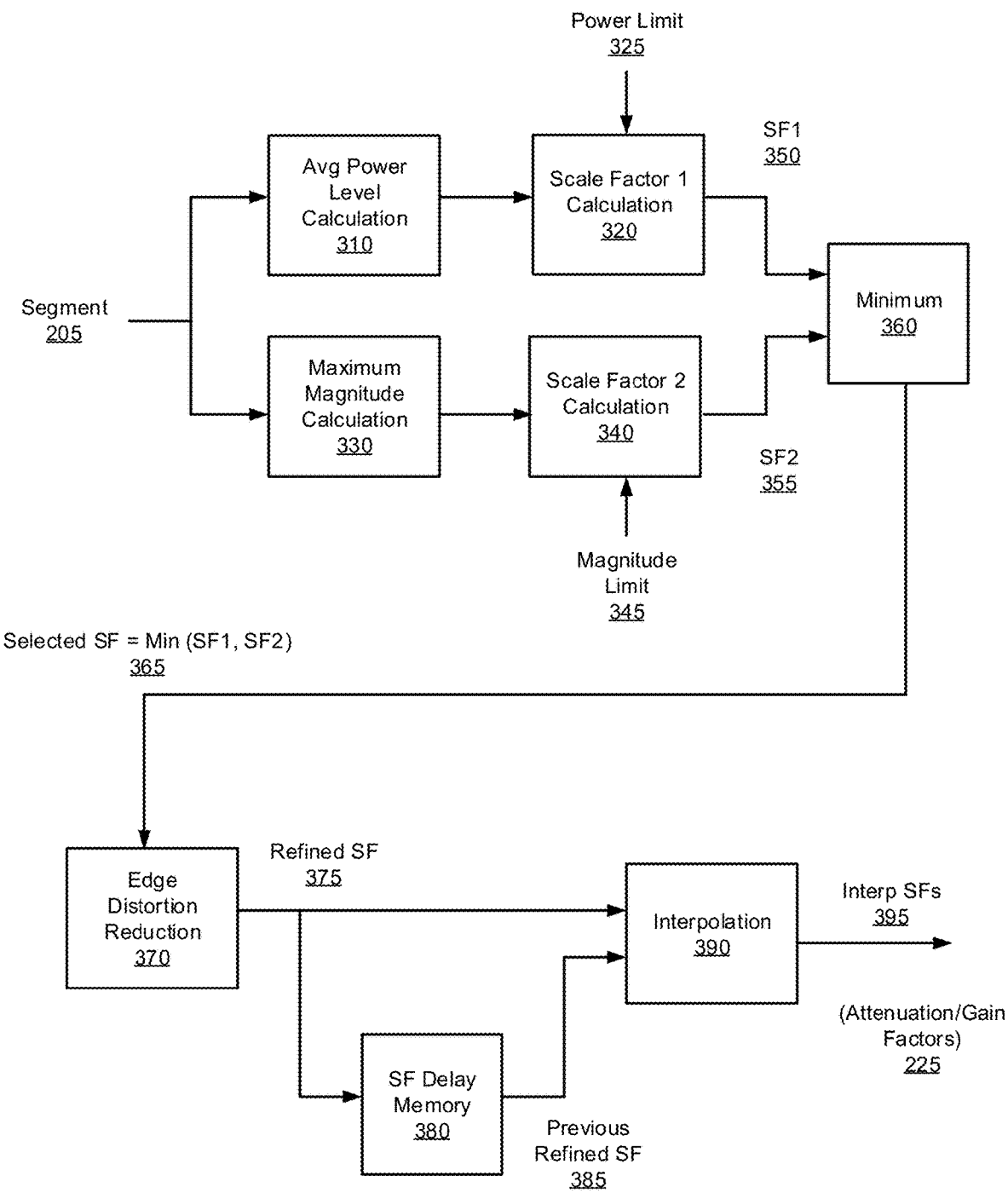
FIG. 3 is a block diagram of the signal analysis circuit of the amplitude control system of FIG. 2, configured in accordance with an embodiment of the present disclosure.

FIG. 3 is a block diagram of the signal analysis circuit 220, configured in accordance with an embodiment of the present disclosure. The signal analysis circuit 220 is shown to include an average power level calculation circuit 310, a first scale factor calculation circuit 320, a maximum magnitude calculation circuit 330, a second scale factor calculation circuit 340, a minimum selection circuit 360, an edge distortion reduction circuit 370, a scale factor delay memory 380, and an interpolation circuit 390.

The average power level calculation circuit 310 is configured to calculate the average power level of the segment 205. In some embodiments, the average power level may be calculated as:

$$\text{Average\_power} = \sum_{i=0}^{n-1} \frac{\text{Data}(i)^2}{n}$$

where Data(i) are the n samples of the segment 205. If n is a power of 2, then a shift operation can be used instead of the more computationally expensive divide operation.

The first scale factor calculation circuit 320 is configured to calculate a first scale factor 350 based on the average power. In some embodiments, the first scale factor may be calculated as:

$$\text{Scaling\_factor1} = \frac{1}{\sqrt{\left(\frac{\text{Average\_power}}{\text{Power\_limit}}\right)}}$$

where the power limit 325 is a specified maximum power limit (also referred to as maximum power level) for the transmitter. The maximum power limit may be based, for example, on the transmitter design specifications, application specific considerations, or any other suitable criteria. The first scale factor is a value that, when multiplied with the original signal data samples, will produce data that has an average power equal to the power limit. A scaling factor less than 1 will attenuate while a scaling factor greater than 1 will amplify the signal.

The maximum magnitude calculation circuit 330 is configured to calculate the maximum magnitude of the absolute value of the data samples of the segment 205. The maximum magnitude may be calculated as:

$$\text{Maximum}_{magnitude} = \max(|\text{Data}(i)|), \text{ for } i=0, \ldots n-1$$

The second scale factor calculation circuit 340 is configured to calculate a second scale factor 355 based on the maximum magnitude. In some embodiments, the second scale factor may be calculated as:

$$\text{Scaling\_factor2} = \frac{\text{Maximum\_magnitude\_limit}}{\text{Maximum\_magnitude}}$$

where the maximum magnitude limit 345 is a specified maximum magnitude value for the DAC 140 (e.g., based on the DAC design specifications such as the number of conversion bits available). The second scale factor is the value that, when multiplied with the original signal data samples, will produce data that is less than or equal to the maximum magnitude limit. Again, a scaling factor less than 1 will attenuate while a scaling factor greater than 1 will amplify the signal.

The minimum selection circuit 360 is configured to select the minimum (e.g., the smaller) of scale factor 350 and scale factor 355 to generate a selected scale factor 365.

The edge distortion reduction circuit 370 is configured to perform edge distortion reduction on the selected scale factor 365 to generate a refined scale factor 375. The operation of the edge distortion reduction circuit 370 will be explained in greater detail below in connection with FIG. 4.

The scale factor delay memory 380 is configured to store the previous value 385 of the refined scale factor, which was associated with the previous segment 205, and which is used for interpolation as described below.

The interpolation circuit 390 is configured to provide interpolated scale factors 395, for each data sample, as an interpolation between the refined scale factor 375, and the previous refined scale factor 385. The interpolation is intended to reduce the presence of relatively sharp edges in the scale factor. Sharp edges in the scale factor can cause sharp edges when it is applied to the transmitted signal which can lead to spectral smearing known as Gibbs phenomenon. In some embodiments, the interpolation may be a linear interpolation, although other interpolation techniques are possible (e.g., a low pass filter). The signal analysis circuit 220 thus provides attenuation/gain factors 225 that comprise the interpolated scale factors 395.

Figure 4:
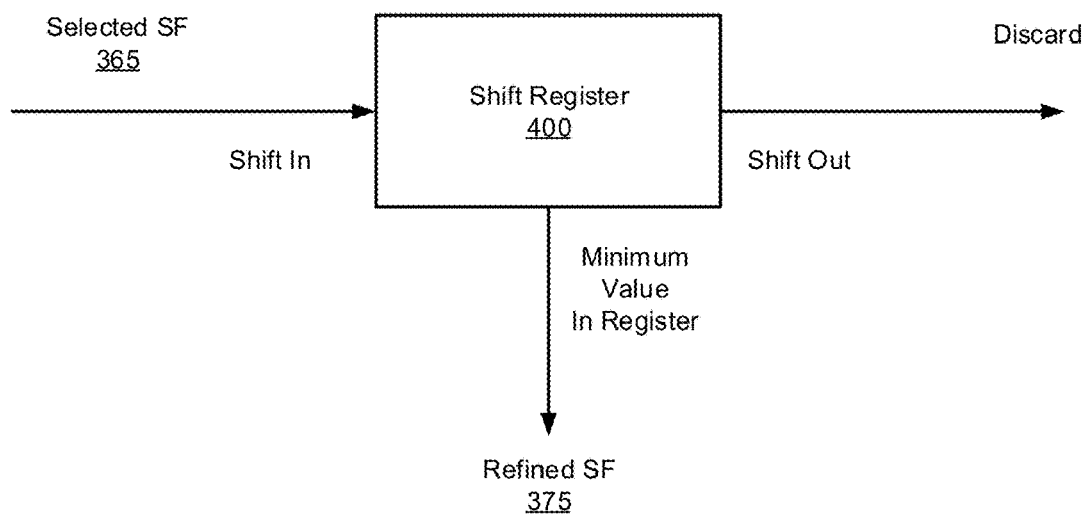
FIG. 4 is a block diagram of the edge distortion reduction circuit of the signal analysis circuit of FIG. 3, configured in accordance with an embodiment of the present disclosure.

FIG. 4 is a block diagram of the edge distortion reduction circuit 370, configured in accordance with an embodiment of the present disclosure. The edge distortion reduction circuit 370 is shown to include a shift register 400. The shift register 400 is configured to store (e.g., shift in) the selected scale factor 365 each time it is presented, which, according to an embodiment, is once for every processed segment 205. The shift register 400 stores the presented values in a first-in-first-out (FIFO) manner, such that, when a new value is shifted in, the oldest value is shifted out and, for this application, discarded. In some embodiments, the shift register has a depth of 4 (or some other integer value in the range of 2 to 20, for instance), which allows it to store the current selected SF 365 along with the three previous selected SFs. The shift register is also configured to provide the minimum (the smallest) of the values that are currently stored in the register for use as a refined scale factor 375.

The purpose of the shift register is to prevent edge distortions that could occur if a signal started or stopped in the middle of a segment. Starting or stopping in the middle of a segment causes an abnormally low average power measurement since the signal is not present in the entire segment.

Figure 5:
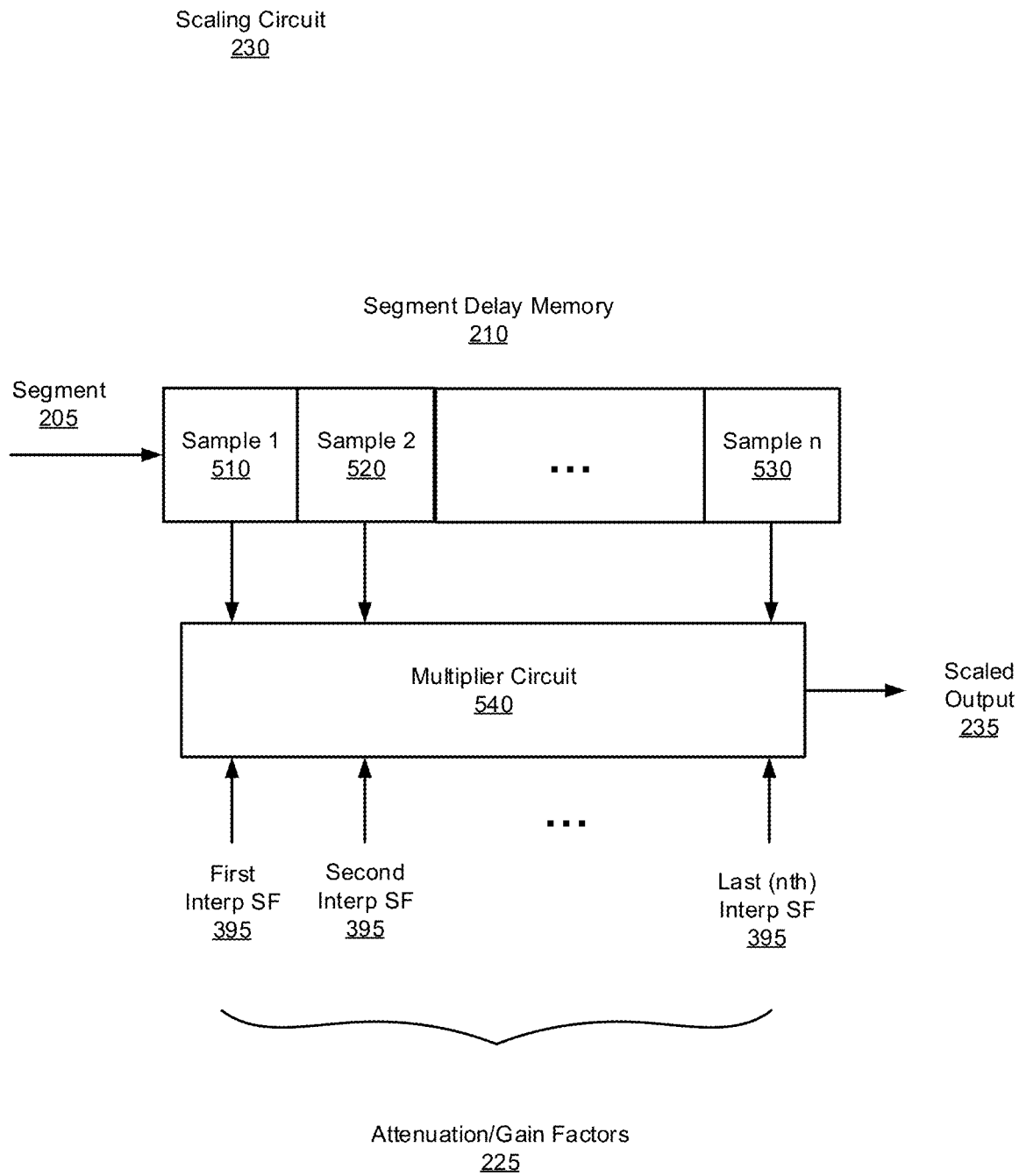
FIG. 5 is a block diagram of the scaling circuit of the amplitude control system of FIG. 2, configured in accordance with an embodiment of the present disclosure.
Figure 8:
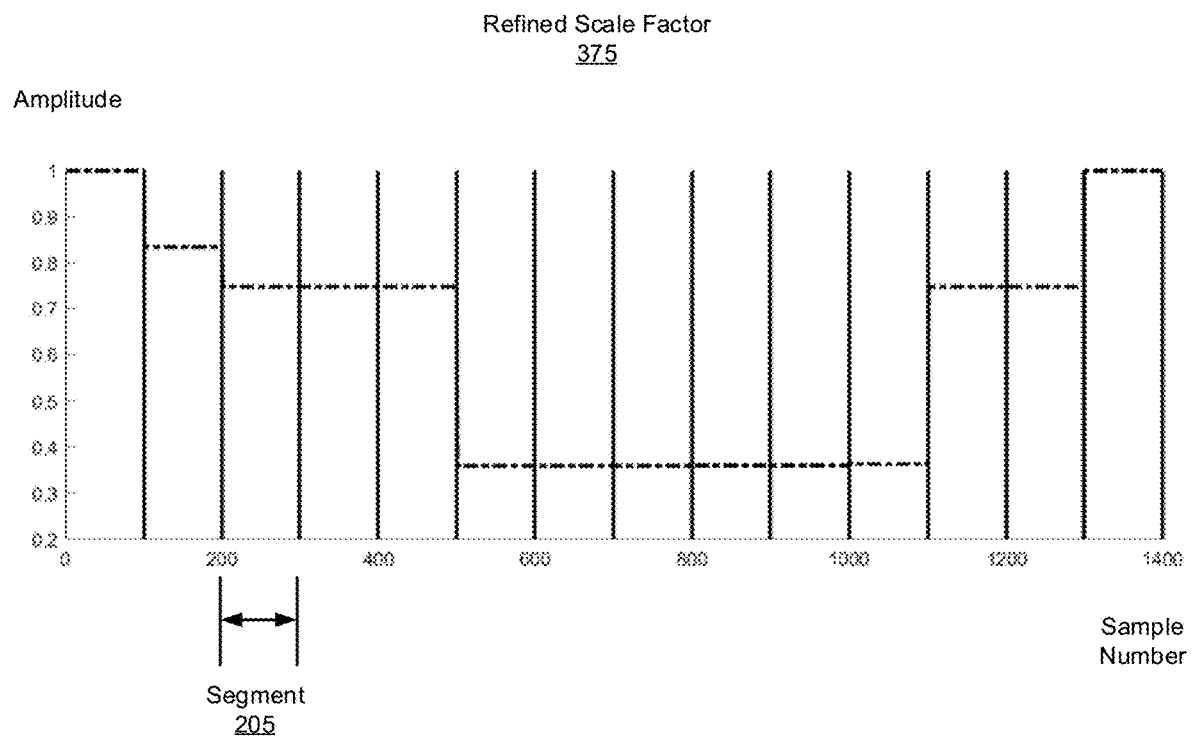
FIG. 8 illustrates refined and interpolated scale factors, in accordance with an embodiment of the present disclosure.
Figure 8:
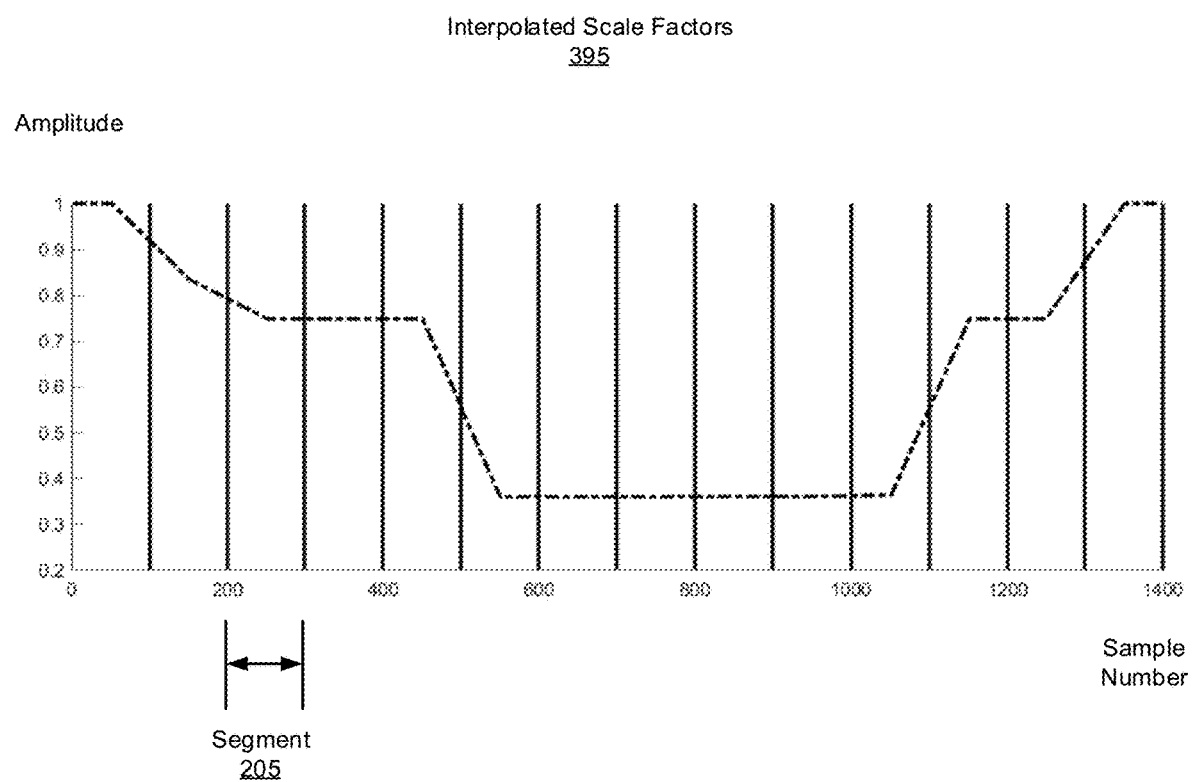

FIG. 5 is a block diagram of the scaling circuit 230, configured in accordance with an embodiment of the present disclosure. The scaling circuit 230 is shown to include a multiplier circuit 540 configured to multiply the data samples in the segment delay memory 210 with the interpolated scale factors 395. In some embodiments, the interpolated scale factors are aligned with the data such that there is an offset of one half of the segment interval (n/2 samples) upon which the scale factor calculations were performed. This is illustrated in FIG. 8 below. The offset and alignment are provided by the segment delay memory 210. Aligning the interpolated scale factors 395 to the center of the data segment from which the scale factors were derived results in a clean output signal (e.g., relatively free from Gibbs phenomenon). In some embodiments, the sample data is streamed in so that the multiplication is performed on every sample clock cycle.

The previously described saturation operation is employed to handle the possibility that the signal sample with the greatest magnitude may be located at a position other than the center of the segment and the interpolated scaling factor for that position may be greater than necessary due to the interpolation.

Figure 6:
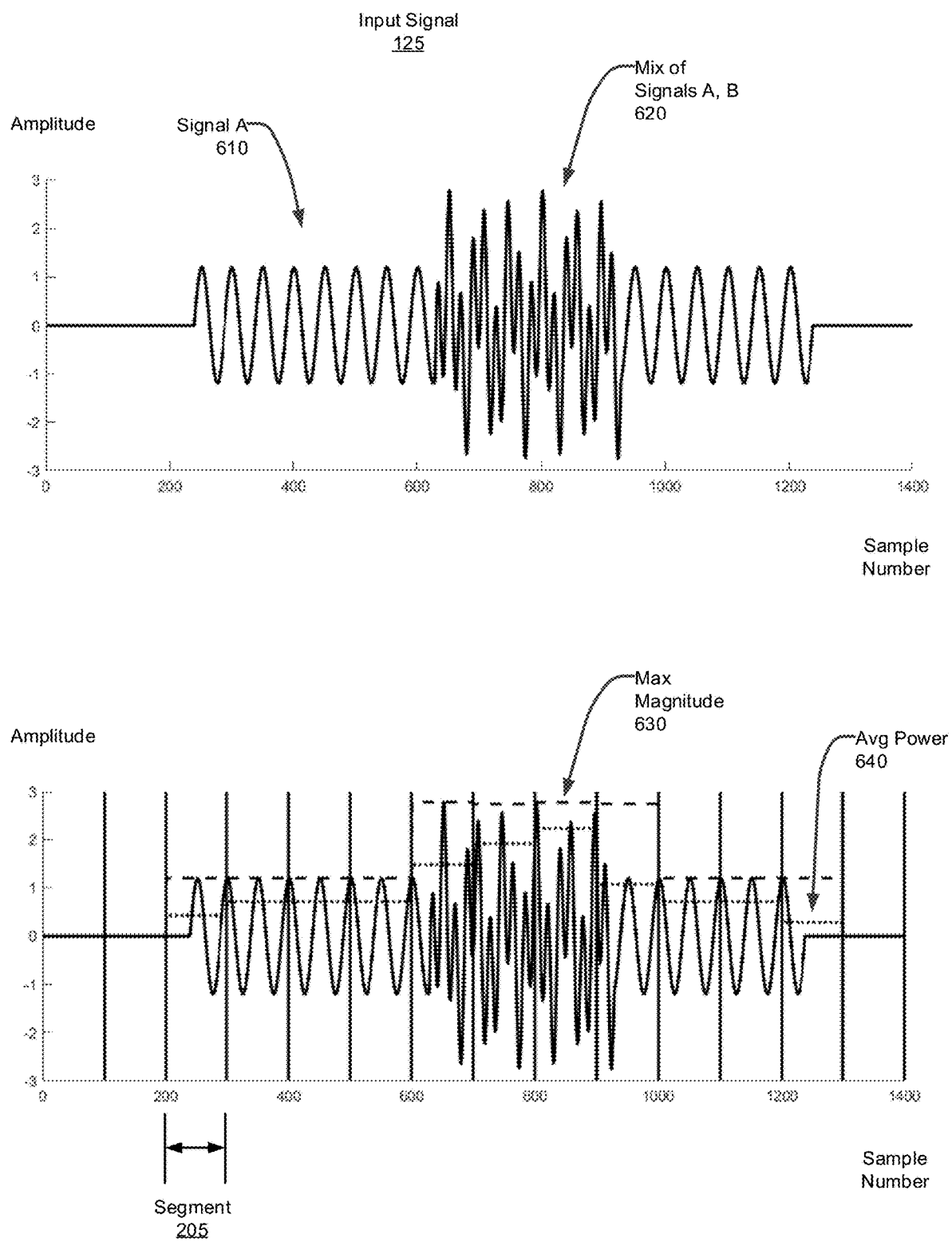
FIG. 6 illustrates an input signal and first stage processing results, in accordance with an embodiment of the present disclosure.

FIG. 6 illustrates an input signal and first stage processing results, in accordance with an embodiment of the present disclosure. The input signal 125 is a mixture of two sinusoidal signals A and B of different amplitudes and frequencies. Signal A 610 is the longer duration sine wave of amplitude 1.2, while signal B is a shorter duration sine wave of amplitude 1.6. The mixture of signals A and B is shown as 620. The calculated maximum signal magnitude 630 is shown for each segment 205 (which in this example comprises 100 samples). The calculated average power 640 is also shown for each segment 205.

Figure 7:
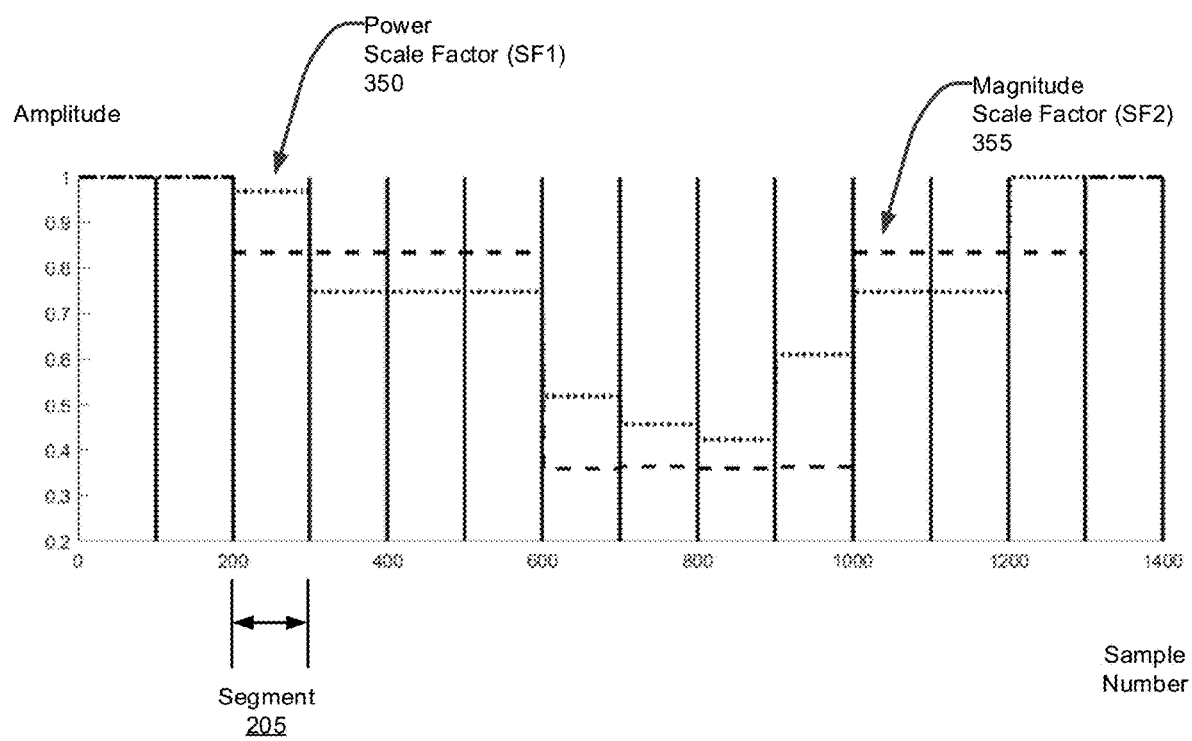
FIG. 7 illustrates computed scale factors, in accordance with an embodiment of the present disclosure.
Figure 7:
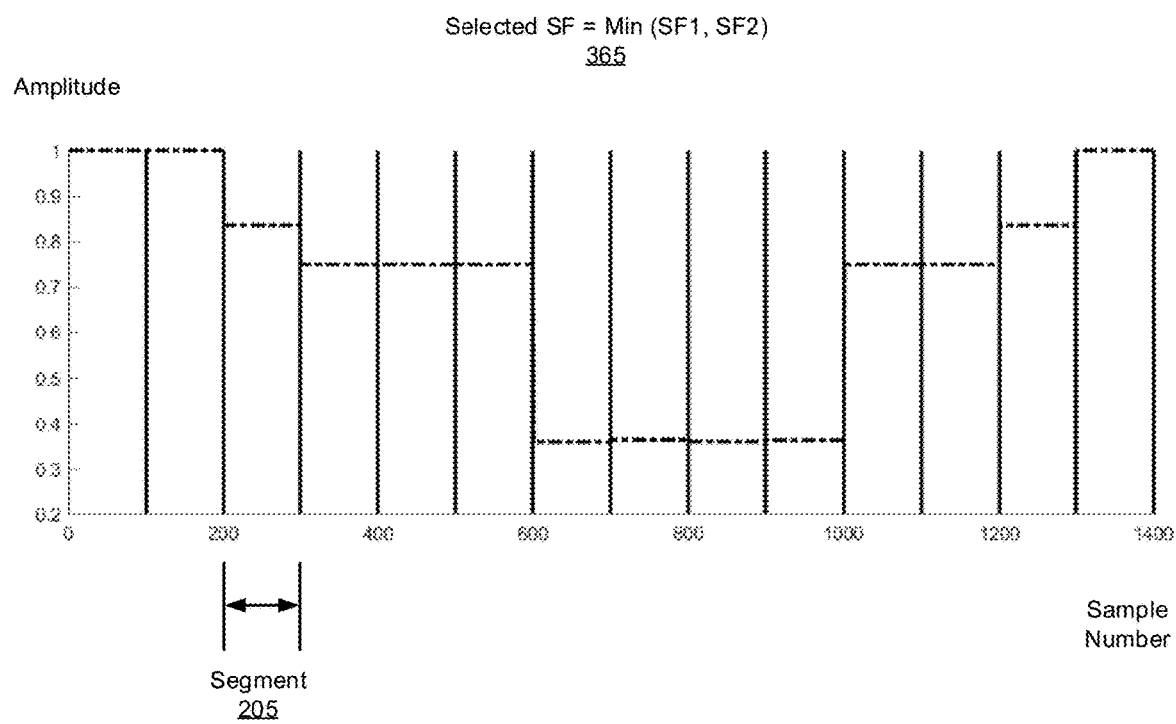

FIG. 7 illustrates computed scale factors, in accordance with an embodiment of the present disclosure. The power scale factor (scale factor 1) 350 and the magnitude scale factor (scale factor 2) 355 are shown for each segment 205. For these calculations, a maximum amplitude limit 345 of 1.0, and a maximum average power limit 325 of 0.4 were selected. The scale factors are capped to a maximum value of 1.0 during times when no signal is present. The selected scale factor 365 is also shown, as the minimum of scale factors 1 and scale factors 2 during each segment 205.

FIG. 8 illustrates the refined and interpolated scale factors, in accordance with an embodiment of the present disclosure. The refined scale factor 375 is shown for each segment 205. The refined scale factor in this example is generated with edge distortion reduction using a shift register with a depth of 3 values. The interpolated scale factors 395 are also shown. Linear interpolation is used in this example. As can be seen, the interpolated scale factors have been shifted so as to be centered in each segment 205. For example, the interpolated scale factors for samples 50-150 are generated by interpolating between the refined scale factors for the first segment (samples 1-100) and the second segment (samples 100-200).

Figure 9:
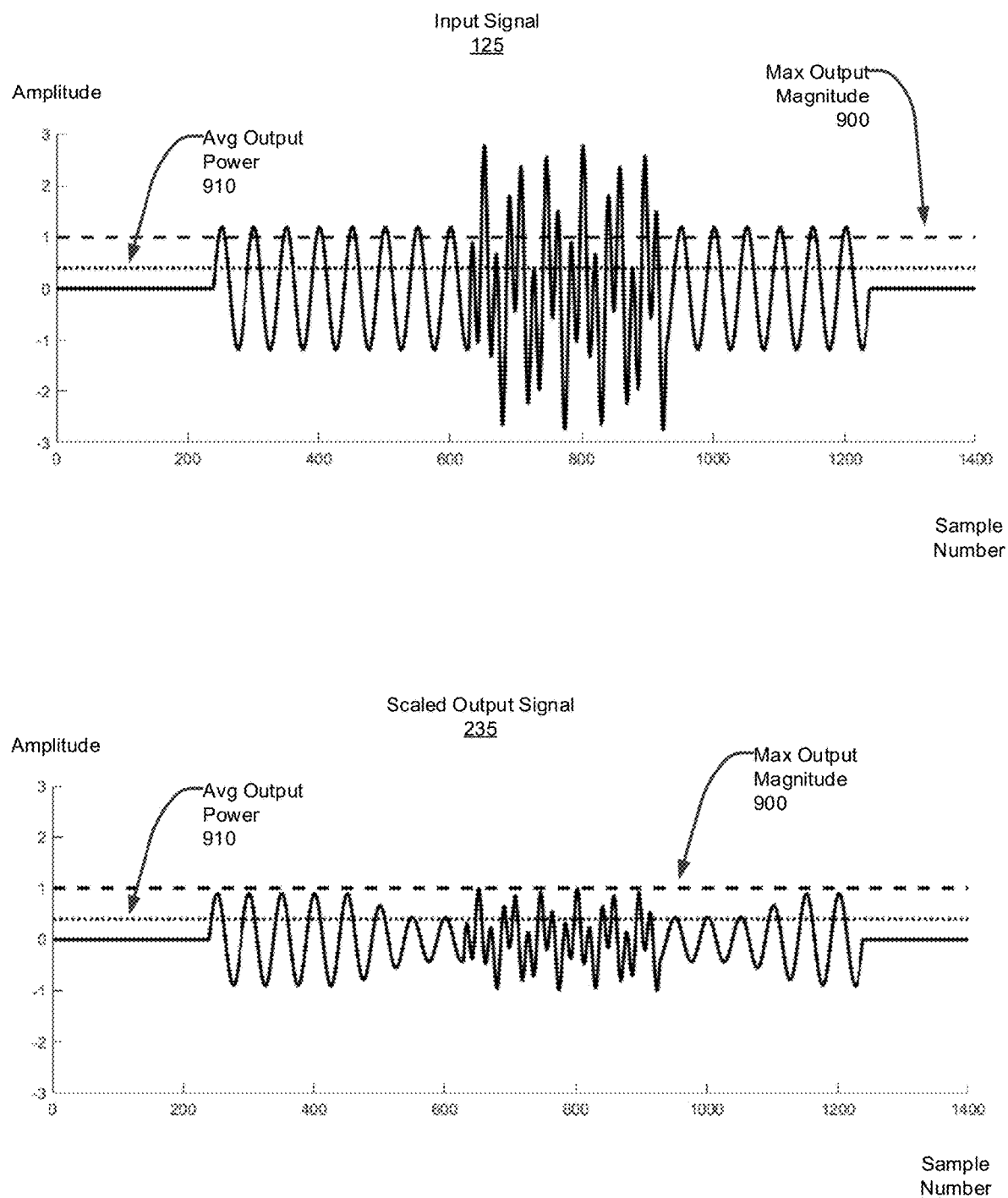
FIG. 9 illustrates a scaled output signal, in accordance with an embodiment of the present disclosure.

FIG. 9 illustrates a scaled output signal, in accordance with an embodiment of the present disclosure. The input signal 125 is shown, for comparison, along with the scaled output signal 235. The maximum output magnitude 900 and the average output power 910 are also indicated on the graphs.

Methodology

Figure 10:
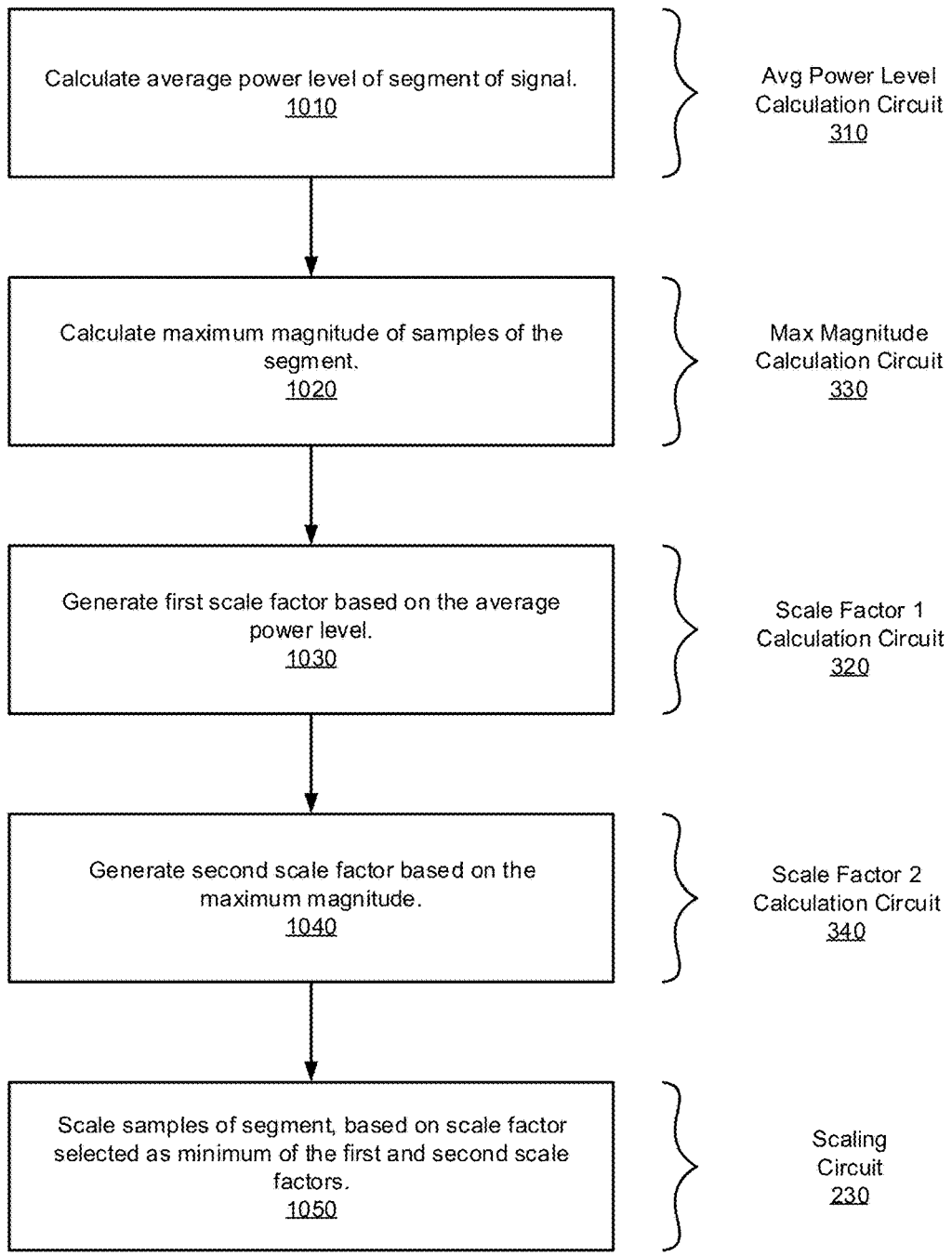
FIG. 10 is a flowchart illustrating a methodology for amplitude control of RF signals for transmission, in accordance with an embodiment of the present disclosure.

FIG. 10 is a flowchart illustrating a methodology 1000 for amplitude control of RF signals for transmission, in accordance with an embodiment of the present disclosure. As can be seen, example method 1000 includes a number of phases and sub-processes, the sequence of which may vary from one embodiment to another. However, when considered in aggregate, these phases and sub-processes form a process for amplitude control of digital RF signals for transmission, in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIG. 10 to the specific components illustrated in FIGS. 1-5 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 10, in one embodiment method 1000 commences, at operation 1010, by calculating an average power level of a segment of the signal to be transmitted. In some embodiments, the signal to be transmitted is a combination of two or more signals, for example from different signal sources, each having characteristics that are not predetermined or otherwise known to the transmitter system.

Next, at operation 1020, a maximum magnitude of the samples of the segment is calculated. At operation 1030, a first scale factor is generated based on the average power level. In some embodiments, the first scale factor is generated as a calculation of a reciprocal of the square root of the ratio of the average power level to a maximum power limit.

At operation 1040, a second scale factor is generated based on the maximum magnitude. In some embodiments, the second scale factor is generated as a calculation of the ratio of the maximum magnitude limit to the maximum magnitude.

At operation 1050, the samples of the segment are scaled (e.g., attenuated or amplified) based on a selected scale factor. The selected scale factor is the minimum of the first scale factor and the second scale factor.

Of course, in some embodiments, additional operations may be performed, as previously described in connection with the system. These additional operations may include, for example, adjusting the first and second scale factors to achieve edge distortion reduction prior to selection of the smaller one, or adjusting the selected scale factor (post-selection). In some embodiments, the interpolation of the scale factor with a previous scale factor may be performed, and a saturation operation may also be performed, as previously described.

Example System

Figure 11:
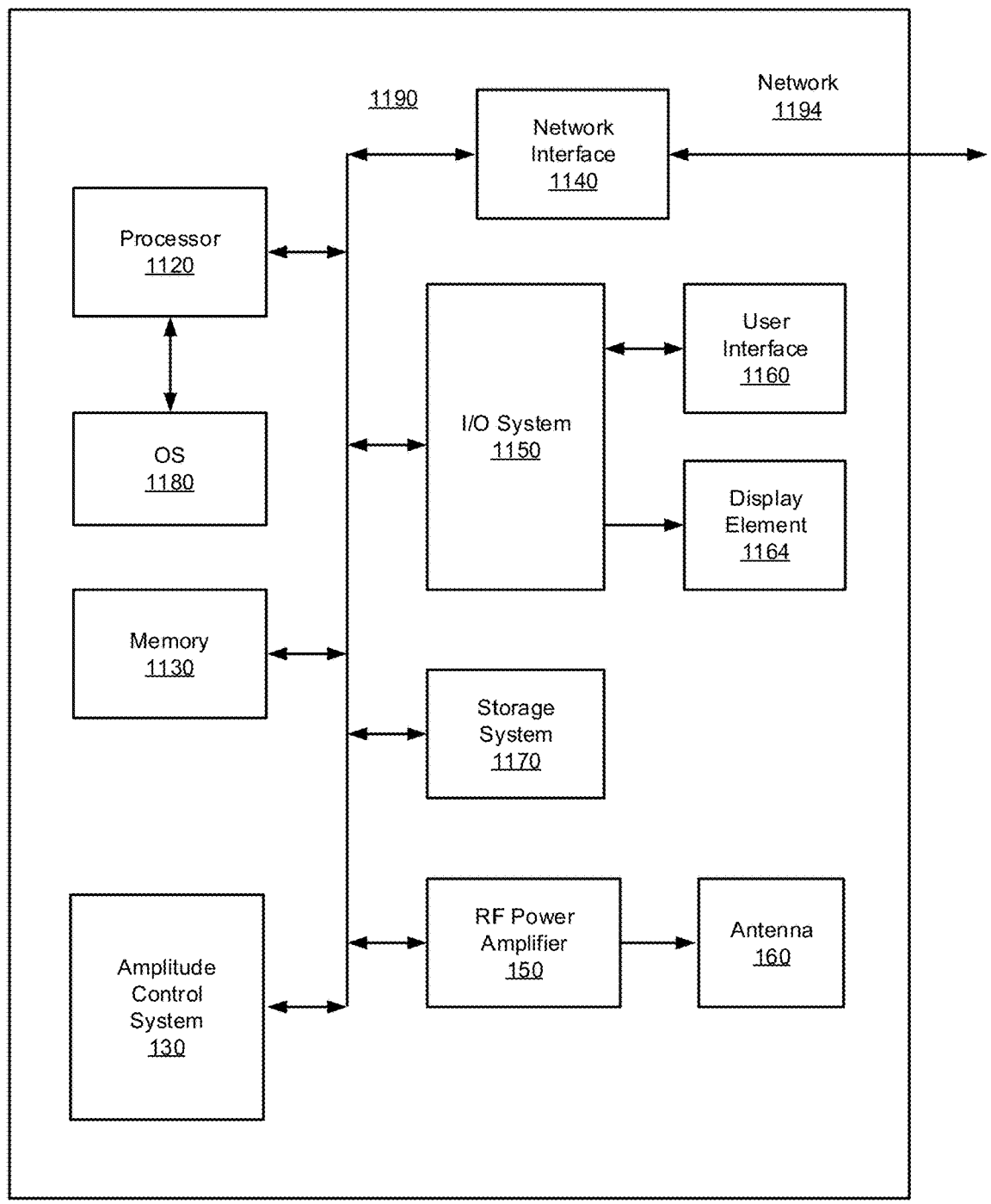
FIG. 11 is a block diagram schematically illustrating a processing platform configured to perform amplitude control of RF signals for transmission, in accordance with an embodiment of the present disclosure.

FIG. 11 is a block diagram schematically illustrating a processing platform 1100 configured to perform amplitude control of RF signals for transmission, in accordance with an embodiment of the present disclosure. In some embodiments, platform 1100, or portions thereof, may be hosted on, or otherwise be incorporated into the electronic systems of an aircraft (or spacecraft, seagoing vessel, ground vehicle, or ground station), data communication device, personal computer, workstation, laptop computer, tablet, touchpad, portable computer, handheld computer, cellular telephone, smartphone, messaging device, embedded system, or any other suitable platform. Any combination of different devices may be used in certain embodiments.

In some embodiments, platform 1100 may comprise any combination of a processor 1120, a memory 1130, amplitude control system 130, a network interface 1140, an input/output (I/O) system 1150, a user interface 1160, a display element 1164, and a storage system 1170, an antenna 160, and an RF power amplifier 150. As can be further seen, a bus and/or interconnect 1190 is also provided to allow for communication between the various components listed above and/or other components not shown. Platform 1100 can be coupled to a network 1194 through network interface 1140 to allow for communications with other computing devices, platforms, devices to be controlled, or other resources. Other componentry and functionality not reflected in the block diagram of FIG. 11 will be apparent in light of this disclosure, and it will be appreciated that other embodiments are not limited to any particular hardware configuration.

Processor 1120 can be any suitable processor, and may include one or more coprocessors or controllers, such as an audio processor, a graphics processing unit, or hardware accelerator, to assist in control and processing operations associated with platform 1100. In some embodiments, the processor 1120 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 1120 may be implemented as a complex instruction set computer (CISC) or a reduced instruction set computer (RISC) processor. In some embodiments, processor 1120 may be configured as an x86 instruction set compatible processor.

Memory 1130 can be implemented using any suitable type of digital storage including, for example, flash memory and/or random-access memory (RAM). In some embodiments, the memory 1130 may include various layers of memory hierarchy and/or memory caches as are known to those of skill in the art. Memory 1130 may be implemented as a volatile memory device such as, but not limited to, a RAM, dynamic RAM (DRAM), or static RAM (SRAM) device. Storage system 1170 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1170 may comprise technology to increase the storage performance enhanced protection for valuable digital media when multiple hard drives are included.

Processor 1120 may be configured to execute an Operating System (OS) 1180 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1100, and therefore may also be implemented using any suitable existing or subsequently-developed platform.

Network interface circuit 1140 can be any appropriate network chip or chipset which allows for wired and/or wireless connection between other components of platform 1100 and/or network 1194, thereby enabling platform 1100 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1150 may be configured to interface between various I/O devices and other components of platform 1100. I/O devices may include, but not be limited to, user interface 1160 and display element 1164. User interface 1160 may include devices (not shown) such as a touchpad, keyboard, and mouse, etc. I/O system 1150 may include a graphics subsystem configured to perform processing of images for rendering on the display element 1164. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1120 or any chipset of platform 1100.

It will be appreciated that in some embodiments, the various components of platform 1100 may be combined or integrated in a system-on-a-chip (SoC) architecture. In some embodiments, the components may be hardware components, firmware components, software components or any suitable combination of hardware, firmware or software.

Amplitude control system 130 is configured to provide attenuation or gain to an RF signal, based on a specified maximum power level or limit and a maximum magnitude level or limit, to optimize transmission efficiency, as described previously. Amplitude control system 130 may include any or all of the circuits/components illustrated in FIGS. 2-5, as described above. These components can be implemented or otherwise used in conjunction with a variety of suitable software and/or hardware that is coupled to or that otherwise forms a part of platform 1100. These components can additionally or alternatively be implemented or otherwise used in conjunction with user I/O devices that are capable of providing information to, and receiving information and commands from, a user.

In some embodiments, these circuits may be installed local to platform 1100, as shown in the example embodiment of FIG. 11. Alternatively, platform 1100 can be implemented in a client-server arrangement wherein at least some functionality associated with these circuits is provided to platform 1100 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 1194 or remotely coupled to network 1194 by one or more other networks and/or communication channels. In some cases, access to resources on a given network or computing system may require credentials such as usernames, passwords, and/or compliance with any other suitable security mechanism.

In various embodiments, platform 1100 may be implemented as a wireless system, a wired system, or a combination of both. When implemented as a wireless system, platform 1100 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 1100 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1194. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componenetry and functionality not reflected in the illustrations will be apparent in light of this disclosure, and it will be appreciated that other embodiments are not limited to any particular hardware or software configuration. Thus, in other embodiments platform 1100 may comprise additional, fewer, or alternative subcomponents as compared to those included in the example embodiment of FIG. 11.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for controlling signal amplitude, the system comprising: a power calculation circuit configured to calculate an average power level of a segment of a signal; a magnitude calculation circuit configured to calculate a maximum magnitude of samples of the segment; a first scale factor calculation circuit configured to generate a first scale factor based on the average power level; a second scale factor calculation circuit configured to generate a second scale factor based on the maximum magnitude; and a scaling circuit configured to select the smaller scale factor of the first or second scale factors, to provide a selected scale factor and scale the samples of the segment based on the selected scale factor. In some cases, the first scale factor is generated as a calculation of a reciprocal of a square root of a ratio of the average power level to a maximum power limit and the second scale factor is generated as a calculation of a ratio of a maximum magnitude limit to the maximum magnitude. In some cases, the system comprises an edge distortion reduction circuit configured to, prior to scaling the samples of the segment based on the selected scale factor, store the selected scale factor along with a number of previously selected scale factors, the previously selected scale factors associated with previously processed segments; and select the smallest scale factor of the stored scale factors, such that the samples of the segment are scaled based on the selected smallest scale factor of the stored scale factors. In some such cases, the system comprises an interpolation circuit configured to generate interpolated scale factors as an interpolation of the selected smallest scale factor of the stored scale factors and a previously selected smallest scale factor of stored scale factors, the previously selected smallest scale factor of stored scale factors associated with the previously processed segment. In some such cases, the scaling circuit is further configured to scale the samples by multiplying samples of the segment by the interpolated scale factors. In some cases, the system further comprises a saturation circuit configured to limit the magnitude of the scaled samples to the maximum magnitude limit.

Another example embodiment of the present disclosure provides a computer program product including one or more machine-readable mediums encoded with instructions that when executed by one or more processors cause a process to be carried out for controlling signal amplitude, the process comprising: calculating an average power level of a segment of a signal; calculating a maximum magnitude of samples of the segment; generating a first scale factor based on the average power level; generating a second scale factor based on the maximum magnitude; and selecting the smaller scale factor of the first or second scale factors, to provide a selected scale factor; scaling the samples of the segment based on the selected scale factor.

In some cases, the first scale factor is generated as a calculation of a reciprocal of a square root of a ratio of the average power level to a maximum power limit. In some cases, the second scale factor is generated as a calculation of a ratio of a maximum magnitude limit to the maximum magnitude. In some cases, prior to scaling the samples of the segment based on the selected scale factor, the process further comprises: storing the selected scale factor along with a number of previously selected scale factors, the previously selected scale factors associated with previously processed segments; and selecting the smallest scale factor of the stored scale factors, such that the samples of the segment are scaled based on the selected smallest scale factor of the stored scale factors. In some such cases, the process further comprises generating interpolated scale factors as an interpolation of the selected smallest scale factor of the stored scale factors and a previously selected smallest scale factor of stored scale factors, the previously selected smallest scale factor of stored scale factors associated with the previously processed segment. In some such cases, the scaling further comprises multiplying samples of the segment by the interpolated scale factors. In some such cases, the process further comprises performing a saturation operation on the scaled samples, the saturation operation to limit the magnitude of the scaled samples to the maximum magnitude limit.

Another example embodiment of the present disclosure provides a method for controlling signal amplitude, the method comprising: calculating, by a processor-based system, an average power level of a segment of a signal; calculating, by the processor-based system, a maximum magnitude of samples of the segment; generating, by the processor-based system, a first scale factor based on the average power level; generating, by the processor-based system, a second scale factor based on the maximum magnitude; selecting, by the processor-based system, the smaller scale factor of the first or second scale factors, to provide a selected scale factor; and scaling, by the processor-based system, the samples of the segment based on the selected scale factor.

In some cases, the first scale factor is generated as a calculation of a reciprocal of a square root of a ratio of the average power level to a maximum power limit. In some cases, the second scale factor is generated as a calculation of a ratio of a maximum magnitude limit to the maximum magnitude. In some cases, prior to scaling the samples of the segment based on the selected scale factor, the method further comprises: storing the selected scale factor along with a number of previously selected scale factors, the previously selected scale factors associated with previously processed segments; and selecting the smallest scale factor of the stored scale factors, such that the samples of the segment are scaled based on the selected smallest scale factor of the stored scale factors. In some such cases, the method further comprises generating interpolated scale factors as an interpolation of the selected smallest scale factor of the stored scale factors and a previously selected smallest scale factor of stored scale factors, the previously selected smallest scale factor of stored scale factors associated with the previously processed segment. In some such cases, the scaling further comprises multiplying samples of the segment by the interpolated scale factors. In some cases, the method further comprises performing a saturation operation on the scaled samples, the saturation operation to limit the magnitude of the scaled samples to the maximum magnitude limit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A system for controlling signal amplitude, the system comprising:
    a power calculation circuit configured to calculate an average power level of a segment of a signal;
    a magnitude calculation circuit configured to calculate a maximum magnitude of samples of the segment;
    a first scale factor calculation circuit configured to generate a first scale factor based on the average power level;
    a second scale factor calculation circuit configured to generate a second scale factor based on the maximum magnitude; and
    a scaling circuit configured to select the smaller scale factor of the first or second scale factors, to provide a selected scale factor and scale the samples of the segment based on the selected scale factor.

2. The system of claim 1, wherein the first scale factor is generated as a calculation of a reciprocal of a square root of a ratio of the average power level to a maximum power limit and the second scale factor is generated as a calculation of a ratio of a maximum magnitude limit to the maximum magnitude.

3. The system of claim 1, further comprising an edge distortion reduction circuit configured to, prior to scaling the samples of the segment based on the selected scale factor, store the selected scale factor along with a number of previously selected scale factors, the previously selected scale factors associated with previously processed segments; and select the smallest scale factor of the stored scale factors, such that the samples of the segment are scaled based on the selected smallest scale factor of the stored scale factors.

4. The system of claim 3, further comprising an interpolation circuit configured to generate interpolated scale factors as an interpolation of the selected smallest scale factor of the stored scale factors and a previously selected smallest scale factor of stored scale factors, the previously selected smallest scale factor of stored scale factors associated with the previously processed segment.

5. The system of claim 4, wherein the scaling circuit is further configured to scale the samples by multiplying samples of the segment by the interpolated scale factors.

6. The system of claim 1, further comprising a saturation circuit configured to limit the magnitude of the scaled samples to the maximum magnitude limit.

7. A computer program product including one or more non-transitory machine-readable mediums encoded with instructions that when executed by one or more processors cause a process to be carried out for controlling signal amplitude, the process comprising:
    calculating an average power level of a segment of a signal;
    calculating a maximum magnitude of samples of the segment;
    generating a first scale factor based on the average power level;
    generating a second scale factor based on the maximum magnitude;
    selecting the smaller scale factor of the first or second scale factors, to provide a selected scale factor; and
    scaling the samples of the segment based on the selected scale factor.

8. The computer program product of claim 7, wherein the first scale factor is generated as a calculation of a reciprocal of a square root of a ratio of the average power level to a maximum power limit.

9. The computer program product of claim 7, wherein the second scale factor is generated as a calculation of a ratio of a maximum magnitude limit to the maximum magnitude.

10. The computer program product of claim 7, wherein prior to scaling the samples of the segment based on the selected scale factor, the process further comprises: storing the selected scale factor along with a number of previously selected scale factors, the previously selected scale factors associated with previously processed segments; and selecting the smallest scale factor of the stored scale factors, such that the samples of the segment are scaled based on the selected smallest scale factor of the stored scale factors.

11. The computer program product of claim 10, further comprising generating interpolated scale factors as an interpolation of the selected smallest scale factor of the stored scale factors and a previously selected smallest scale factor of stored scale factors, the previously selected smallest scale factor of stored scale factors associated with the previously processed segment.

12. The computer program product of claim 11, wherein the scaling further comprises multiplying samples of the segment by the interpolated scale factors.

13. The computer program product of claim 7, further comprising performing a saturation operation on the scaled samples, the saturation operation to limit the magnitude of the scaled samples to the maximum magnitude limit.

14. A method for controlling signal amplitude, the method comprising:
    calculating, by a processor-based system, an average power level of a segment of a signal;
    calculating, by the processor-based system, a maximum magnitude of samples of the segment;
    generating, by the processor-based system, a first scale factor based on the average power level;
    generating, by the processor-based system, a second scale factor based on the maximum magnitude;
    selecting, by the processor-based system, the smaller scale factor of the first or second scale factors, to provide a selected scale factor; and
    scaling, by the processor-based system, the samples of the segment based on the selected scale factor.

15. The method of claim 14, wherein the first scale factor is generated as a calculation of a reciprocal of a square root of a ratio of the average power level to a maximum power limit.

16. The method of claim 14, wherein the second scale factor is generated as a calculation of a ratio of a maximum magnitude limit to the maximum magnitude.

17. The method of claim 14, wherein prior to scaling the samples of the segment based on the selected scale factor, the method further comprises: storing the selected scale factor along with a number of previously selected scale factors, the previously selected scale factors associated with previously processed segments; and selecting the smallest scale factor of the stored scale factors, such that the samples of the segment are scaled based on the selected smallest scale factor of the stored scale factors.

18. The method of claim 17, further comprising generating interpolated scale factors as an interpolation of the selected smallest scale factor of the stored scale factors and a previously selected smallest scale factor of stored scale factors, the previously selected smallest scale factor of stored scale factors associated with the previously processed segment.

19. The method of claim 18, wherein the scaling further comprises multiplying samples of the segment by the interpolated scale factors.

20. The method of claim 14, further comprising performing a saturation operation on the scaled samples, the saturation operation to limit the magnitude of the scaled samples to the maximum magnitude limit.

* * * * *